United States Patent [19]

Bailey

[11] 3,974,394

[45] Aug. 10, 1976

[54] CAPTURING HYDRO POWER, EARTH POWER AND WIND POWER WITH MEANS AND METHODS OF STORING SAME

[76] Inventor: Wayne Bailey, Box 89, Johnsonville, N.Y. 12154

[22] Filed: July 10, 1974

[21] Appl. No.: 486,966

[52] U.S. Cl. .................................... 290/44; 290/55
[51] Int. Cl.² ...................... F24J 3/02; F03D 9/02
[58] Field of Search .................. 290/42, 44, 55, 52, 290/54

[56] References Cited
UNITED STATES PATENTS

| | | | |
|---|---|---|---|
| 1,467,033 | 9/1923 | Goodman | 290/44 |
| 1,822,078 | 9/1931 | Bucklen | 290/44 |
| 3,140,986 | 7/1964 | Hubbard | 290/52 X |
| 3,743,848 | 7/1973 | Strickland | 290/44 |
| 3,751,673 | 8/1973 | Sprankle | 290/52 |
| 3,806,733 | 4/1974 | Haanen | 290/44 |
| 3,808,445 | 4/1974 | Bailey | 290/42 |
| 3,810,717 | 5/1974 | Rakcevic | 290/52 |

Primary Examiner—Robert K. Schaefer
Assistant Examiner—John W. Redman

[57] ABSTRACT

In areas where wind power, hydro power and earth heat power are all available and are to be developed, a common means and method of storing such power during off peak periods of power use are frequently required. Here power storage is accomplished by the lifting of under ground weights. Earth power may be geothermal heats, volcanic heats, heats from hot springs, deep holes in the earth, or heats from deep oil or gas wells, such as come to the surface when they bring up oil or natural gas. These are all here combined as a common source of power. Any or all may contribute power to the power storage.

7 Claims, 4 Drawing Figures

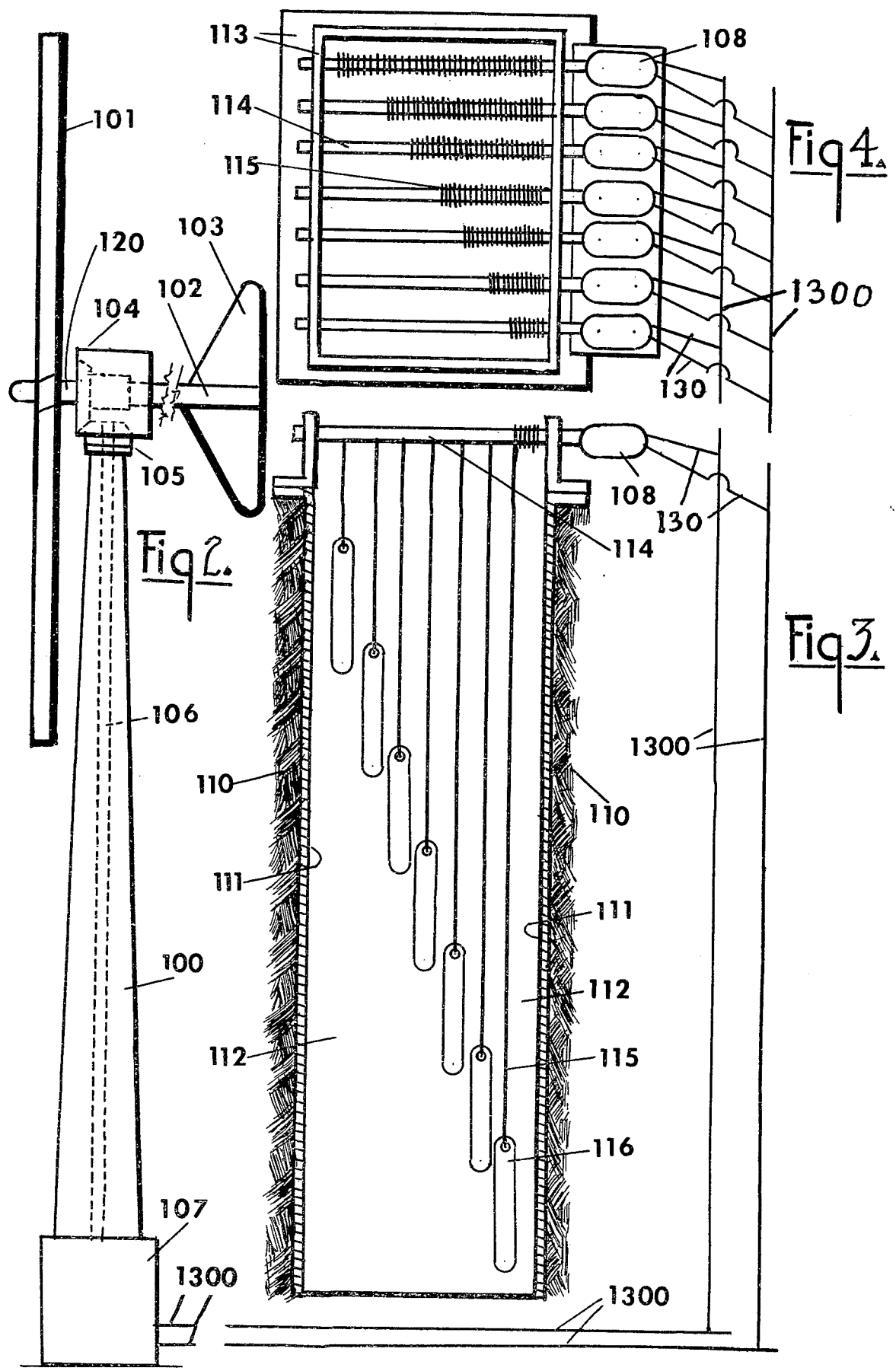

CAPTURING HYDRO POWER, EARTH POWER AND WIND POWER WITH MEANS AND METHODS OF STORING SAME

IN THE DRAWINGS,

FIG. 2, shows a windmill, swivelling a bevel gear housing that transmits its wind power through a vertical shaft to an electric dynamo or generator, positioned at a lower level, and sending its electric energy into a common power line as used by the equipment shown in FIG. 1.

Figure 1:
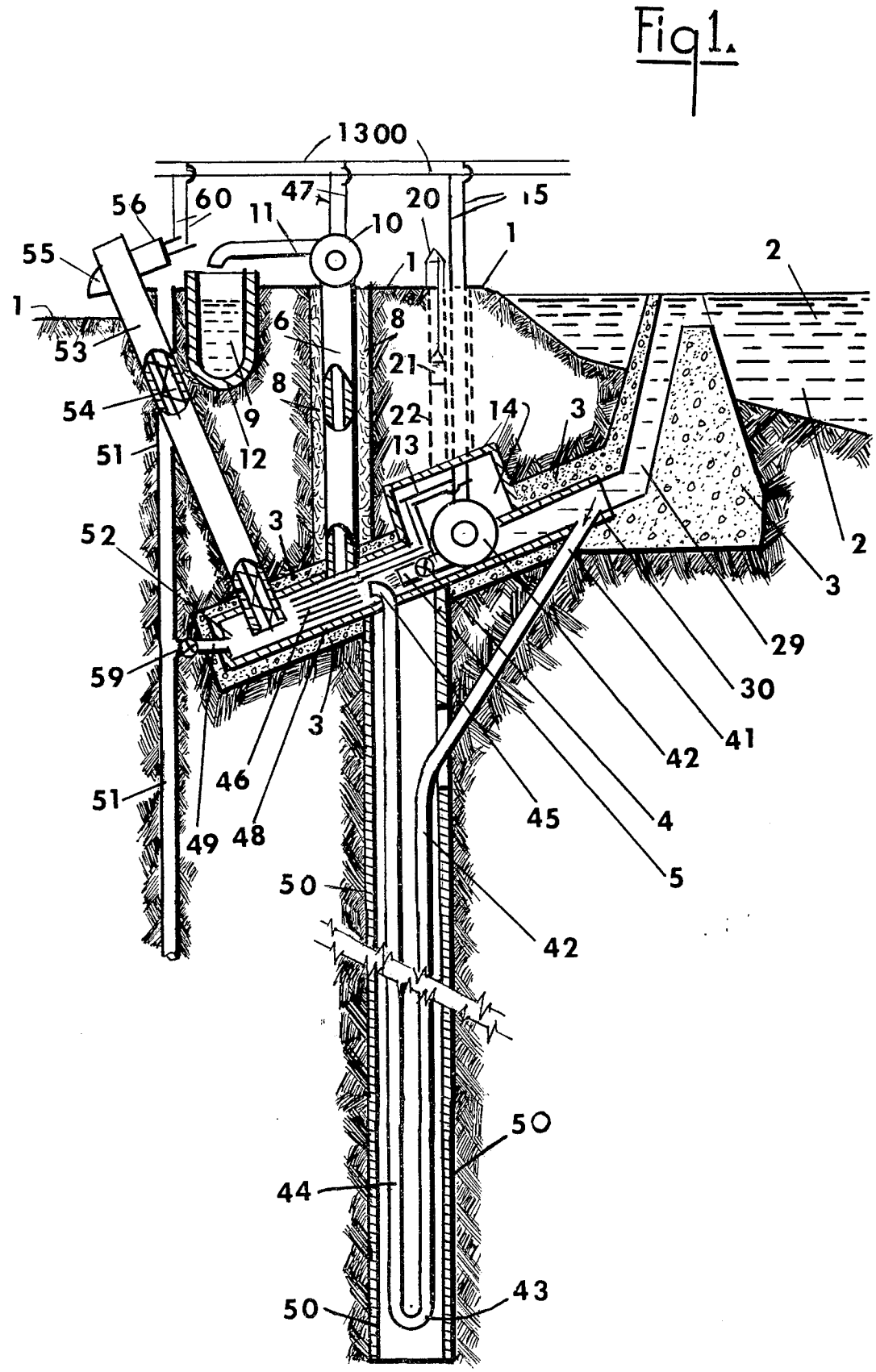
FIG. 1, shows a hydraulic power installation, making steam with the hydro power and picking up earth heat as hot water to aid the electric boiler in the steam and electric power producing process.

FIG. 3 is a sectional view of my underground power storage that is accomplished by the lifting of weights. Since wind power particularly is apt to be intermittent, this form of power storage can make it substantially continuous. It also stores power during off peak periods of electric power use.

FIG. 4 is a plan view of my underground weight lifting power storage.

All figures are tied together by a common set of electric power lines to which all may provide electric current, and at times some may draw electric current therefrom, for their operation, either continuous or intermittent.

In FIG. 1 the numeral 1 shows the earth's surface (or approximate ground level) . . . numeral 2 being a body of water situated near by. Water from the water source plunges through a fore-bay tube or concrete water race way cover, entering pipe 30 that delivers it (the water) to a hydro wheel or water motor attached to an electric generator not shown in the drawings. After the water has passed through water motor 42 it issues from outlet pipe 5 through water valve 4. After this it passes to and through water heating (electric water heating) elements designated by numeral 46 all contained within tube 48. If the water contains salt or other particles these are collected in the salt or particles sump shown as numeral 52. A drain off pipe 49 with its valve 59 is provided to let out any unwanted surplus water into a deep pipe 51. Such a deep pipe 51 can be an old dry oil well pipe which will carry any unwanted surplus water into a deep hole in the earth.

Steam from the water heater 46 goes up through steam tube 6 into steam turbine 10 which is attached rotatively to an electric generator that does not appear in the drawings but makes electricity that it delivers to the overhead power lines 1300. A salt and particle lift tube 53 contains a motor actuated screw lift device 54 the lift screw driven by electric motor 56 pours the lifted salt and particle contents out at spout 55.

In the meantime, water has been withdrawn from water tube 30 by earth heating water tube 41. This water is taken to a long deep U-tube in which the water is heated by the earth's warmth as that warmth steadily comes to the earth's surface.

It is well established in geology that the temperature of the earth's crust roughly increases about 88° per mile as the crust is penetrated vertically going toward the earth's center. This is the earth heat picked up by the U-tube 43 on its water down side 42 and on its water upside, namely water tube 44. At the top of tube 44 is a tube bend 45 that empties the warmed water into steam generator 46. Electric power lines 47 lead electric current generated by the electric generator rotated by water wheel 10, up into the main power lines 1300 as shown here on the drawings. Likewise power lines 15 take the electricity from the electric generator rotatively moved by water motor 42 these power lines 15 delivering this power onto the main power transmission lines 1300. From elevator house 20 elevator 21 moves up and down through elevator shaft 22 to hydro-electric power room 14. The U-tube 42 – 43 and 44 are suitably encased in earth heat power protection tube designated here as numeral 50.

Turning to FIG. 2 we find a windmill 100 driven by a two bladed propellor 101, kept in line with the wind by wind guide vane 103 mounted on shaft 102. The windmill blades are mounted on a rotating tube 120 fitting over shaft 102, this tube carrying a bevel gear not shown in the drawings. The electric generator 107 is driven by a vertical power shaft 106 on the upper portion of which is a suitable mounted bevel gear meshing with the bevel gear on the tube to which the windmill blades 101 are mounted.

So, as the wind blows the windmill blades 101 the bevel meshing with the bevel gear in bevel gear housing 104 transmits the wind power down through vertical shaft 106 to electric generator 107. This electric current goes directly in to power lines 1300, the same power lines 1300 as shown in FIG. 1.

Windpower is intermittent power. To be made into continuous power it is necessary to have a power storage means from which electric power can issue when the wind is not generating sufficient power by means of the windmill 101.

In a sidewise sectional view of FIG. 3 I show my underground electric power storage means by the use of weights 116 attached to lowering and lifting cables 115. These weights operate up and down vertically through an underground 110 casement 111. It may be in a hole excavated for this purpose or it can extend downward through a natural cave utilized for this same power storage purpose. At the ground level surface I show a square metal frame 113 carrying numerous rotating shafts 114. Each of these shafts 114 are rotatively connected to a motor dynamo 108.

When the windmill or any of the power producing means shown in FIG. 1 are desirous of storing their power, the y successively actuate the motor-dynamoes shown here as numeral 108. Successively shafts 114 bring the weights 116 up near the ground level by the winding of their cables 115 on the various rotating shafts 114, again in a successive manner. With all the weights so lifted, considerable electric power can thus be stored which is released to the power line 1300 when the weights later are allowed to drop and rotatively move motordynamoes 108, as dynamoes, which send electricity then into power line 1300 as shown in the drawings.

FIG. 4 shows how the rotating weight lifting and weight lowering shafts are arranged in frame 113 at the top of the power storage underground apparatus . . . and how the units 108 when storing electric power act as motors winding up the cables 115 on their rotating shafts 114. Then when the electric power is to be released to high line 1300 each of the units 108 then functions as a dynamoe, swinging back electrical energy through the electrical leads 130 in each case. Swivel 105 permits the windmill to have its blades turn in any horizontal direction always transmitting power through power shaft 106 to the electrical generator 107.

I claim:

1. In an underground hydro power plant, a source of water at or near the surface of the earth, a conduit attached to a water turbine positioned deep down in the earth said conduit capable of leading a continuous flow of water from said water source to said deeply positioned water turbine, said conduit being heated by the natural up coming heat of the earth, and electric generator attached to and actuated by said deeply positioned water turbine, as easily cleanable electrically heated steam generator heated by electricity from said deeply positioned electric generator, heat insulation around said steam generator, a steam turbine connected by a heat insulated steam pipe to said electrically heated steam generator, an electric generator rotatively connected to said steam turbine, a sump for collecting residue accumulated on said steam generator, means for removing said residue out of said sump, a water outlet pipe connected to said water turbine and to said steam generator for removing excess water therefrom, a steam condenser connected to said steam turbine, for condensing the exhaust steam issuing from said steam turbine, and a still more deeply positioned U tube receiving water from said water source and after a long travel of said received water, downward, and then upward through said U tube, said U tube positioned to receive substantial amounts of heat from the earth or other heat giving material surrounding it, and deliver warm water thus warmed to said steam boiler or steam generator, and a power line receiving electricity from one of said electric generators.

2. The invention as claimed in claim 1, including a ground heat imparting shield tube surrounding said U tube.

3. The invention as claimed in claim 1, including said electric power line receiving electricity from said electrical generator actuated by said steam turbine.

4. The invention as claimed in claim 1, including said electric power line receiving electricity from said electric generator actuated by said deeply positioned liquid turbine.

5. The invention as claimed in claim 1, including an electrical generator actuated by a windmill, said windmill actuated electrical generator connected to said same electric power line.

6. The invention as claimed in claim 1, including power storage means comprising a series of weights to be lifted by power from the underground hydro power plant, said power to be later returned to said power line as and when it is required and accomplished by the lowering of said lifted weights.

7. In a windmill power plant, a windmill, a windmill actuated electric generator connected to a weight lifting power storage device.

* * * * *